C. G. CASHMAN.
UNIVERSAL VARIABLE CHUCK.
APPLICATION FILED SEPT. 19, 1919.
1,357,843.
Patented Nov. 2, 1920.
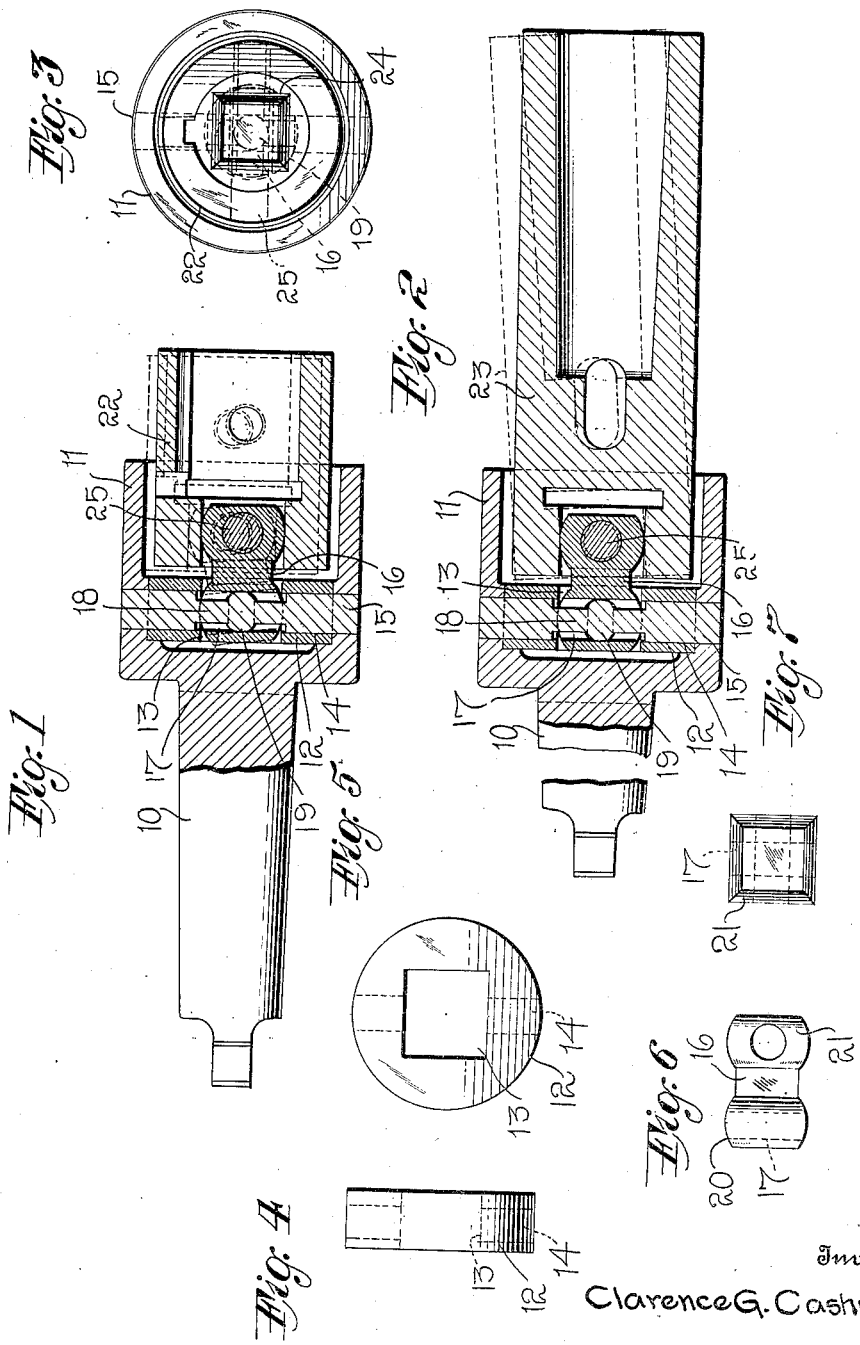
Inventor
Clarence G. Cashman
By Bradford Morrill Birman
Attorneys

UNITED STATES PATENT OFFICE.

CLARENCE G. CASHMAN, OF WAYNESBORO, PENNSYLVANIA, ASSIGNOR OF ONE-HALF TO JOHN B. EADER, OF WAYNESBORO, PENNSYLVANIA.

UNIVERSAL VARIABLE CHUCK.

1,357,843.  Specification of Letters Patent.  Patented Nov. 2, 1920.

Application filed September 19, 1919. Serial No. 324,812.

*To all whom it may concern:*

Be it known that I, CLARENCE G. CASHMAN, a citizen of the United States, residing at Waynesboro, in the county of Franklin and State of Pennsylvania, have invented certain new and useful Improvements in Universal Variable Chucks, of which the following is a specification.

This invention relates to universal variable chucks and has for an object to provide a chuck which may be employed in a machining installation, such, for instance, as a boring or general use machine, and provides means whereby the axis of rotation of the boring or machining tool may differ from the axis of drive, such variation being either angular relative to the axis of drive or in offset parallelism.

Referring to the accompanying drawings which form a part hereof, and on which similar reference characters indicate similar parts, Figure 1 is a view in diametrical section of a type embodying a short chuck;

Fig. 2 is a view similar to Fig. 1 in diametrical section showing an implement with a long chuck;

Fig. 3 is a view in end elevation of the type shown at Fig. 1;

Fig. 4 is a view in edge elevation of the bushing ring employed within the housing;

Fig. 5 is a view of the bushing ring in side elevation;

Fig. 6 is a view of the link connector in side elevation; and

Fig. 7 is a view of the link connector in end elevation.

The device comprises a shank 10 which is inserted into the boring spindle of the machine in substantially the usual and ordinary manner, and carried thereby, preferably, though not necessarily formed integral therewith, is the housing 11. Within the housing 11 is secured a disk 12 having a squared opening 13 axially thereof and with a perforation 14 for a pin 15.

Upon the pin 15 is secured the universal link member 16, such link member being provided with a perforation 17 to receive the pin 15. The body portion of the pin 15 where it engages the disk 12 and housing 11 corresponds in diameter to the opening 17 of the link 16 so that such pin 15 may be inserted through the opening 16 and the perforations of the disk 12 and housing 11. Within the squared opening 13, however, the pin 15 is reduced in size, as indicated at 18, and is provided with a spherical portion 19 corresponding in diameter to the body portion of the pin 15 and opening 17 so that the link member is free to oscillate with the center of the spherical portion 19 as a center. The link member 16 is also formed with an enlargement having its four sides struck upon the arc of a circle, as indicated at 20 in Fig. 6, with the center of the arcs corresponding with the center of the spherical portion 19 and its maximum diameter corresponding to and fitted within the squared opening 13, whereby, notwithstanding the oscillation of the link member 16 upon the pin 15, it is at all times snugly engaged within the squared opening 13, receiving power from the disk 12 as the device is rotated from the machine spindle.

The end of the link 16 opposite the enlargement 20 is provided with an enlargement 21 corresponding in all particulars with the enlargement 20, both ends of the link member 16 being identical; also all four sides being identical. Operating upon the link member 16 is a chuck member shown at Fig. 1 as a short chuck 22 and at Fig. 2 as a long chuck 23. Aside from the lengths of the chucks 22 and 23 and the difference in the means for engaging a tool within the chuck, the said chucks correspond identically in the manner of engagement with and operation from the link member 16. This comprises a squared opening 24 formed in the chuck member, as shown more particularly at Fig. 3, which engages upon the end of the link member opposite its engagement with the disk 12. A pin 25 is inserted through the link and through the chuck, such pin 25 corresponding identically with the pin 15, except being shorter than the pin 15, the length corresponding to the diameter of the chucks 22 and 23, as indicated more particularly at Fig. 3.

As the link member 16 is free to oscillate in all directions upon the pin 15, it is likewise free to oscillate in all directions upon the pin 25 so that the chuck may assume a position wherein its axis varies from the axis of rotation of the shank 10, such variation being angular, as shown at Fig. 1, or in parallelism, as shown at Fig. 2, dotted line positions being shown at such figures to indicate such positions, it being understood, however, that either may assume the angular or the offset parallel position, or that either may vary between such positions or assume other similar positions whereby the axis of boring provided by the chuck and the tool engaged therein is not controlled by the axis of drive. The means of engaging the boring or other tool within the chuck of either type shown at Fig. 1 or Fig. 2, is immaterial to the present invention and may embody any usual, ordinary or preferred means of securing the boring or other tool within the chuck.

Having thus fully described my said invention, what I claim as new and desire to secure by Letters Patent, is:

1. The universal variable machine chuck comprising, a housing having a circular bore, a circular disk disposed within the circular bore and provided with a squared opening, a chuck member disposed within the housing and provided with a squared opening, a connecting member square in cross section having its opposite ends disposed within the squared openings of the chuck and disk respectively and provided with openings transversely therethrough and a pin inserted through the housing and the disk and positioned within one of the openings of the connecting member.

2. A universal variable machine chuck comprising, a housing having a cylindrical bore, a circular disk fitting and disposed within the circular bore and provided with a squared opening, a chuck disposed within the housing and provided with a squared opening, a connecting member having bilges at its opposite ends and said bilges being square in transverse section and fitting within the squared openings of the disk and chuck member and also provided with openings through the bilges concentric with the curvatures of the bilges, a pin inserted through the chuck member and one of said openings and a pin inserted through the housing member, the disk and the other of said openings.

3. A universal variable machine chuck comprising, a housing having a bore circular in cross section and stepped as to diameter, a disk disposed upon one of the steps occupying an intermediate diametrical position and provided with a squared opening, a connecting member having a squared bilged extremity disposed within the squared opening and provided with a perforation concentric with the curvature of the bilge and a pin inserted through the housing, the disk and the opening, said pin being of smaller diameter than the opening in the bilge and having a spherical enlargement centrally of the bilge the curvature of which is concentric with the curvature of the bilge.

In witness whereof, I have hereunto set my hand and seal at Waynesboro, Pennsylvania, this 18th day of September, A. D. nineteen hundred and nineteen.

CLARENCE G. CASHMAN. [L. S.]

Witnesses:
H. E. CRAIG,
ALF. N. RUSSEL.